F. O. STROMBORG.
SCREENING DEVICE.
APPLICATION FILED OCT. 6, 1910.
1,005,900.
Patented Oct. 17, 1911.
3 SHEETS—SHEET 1.
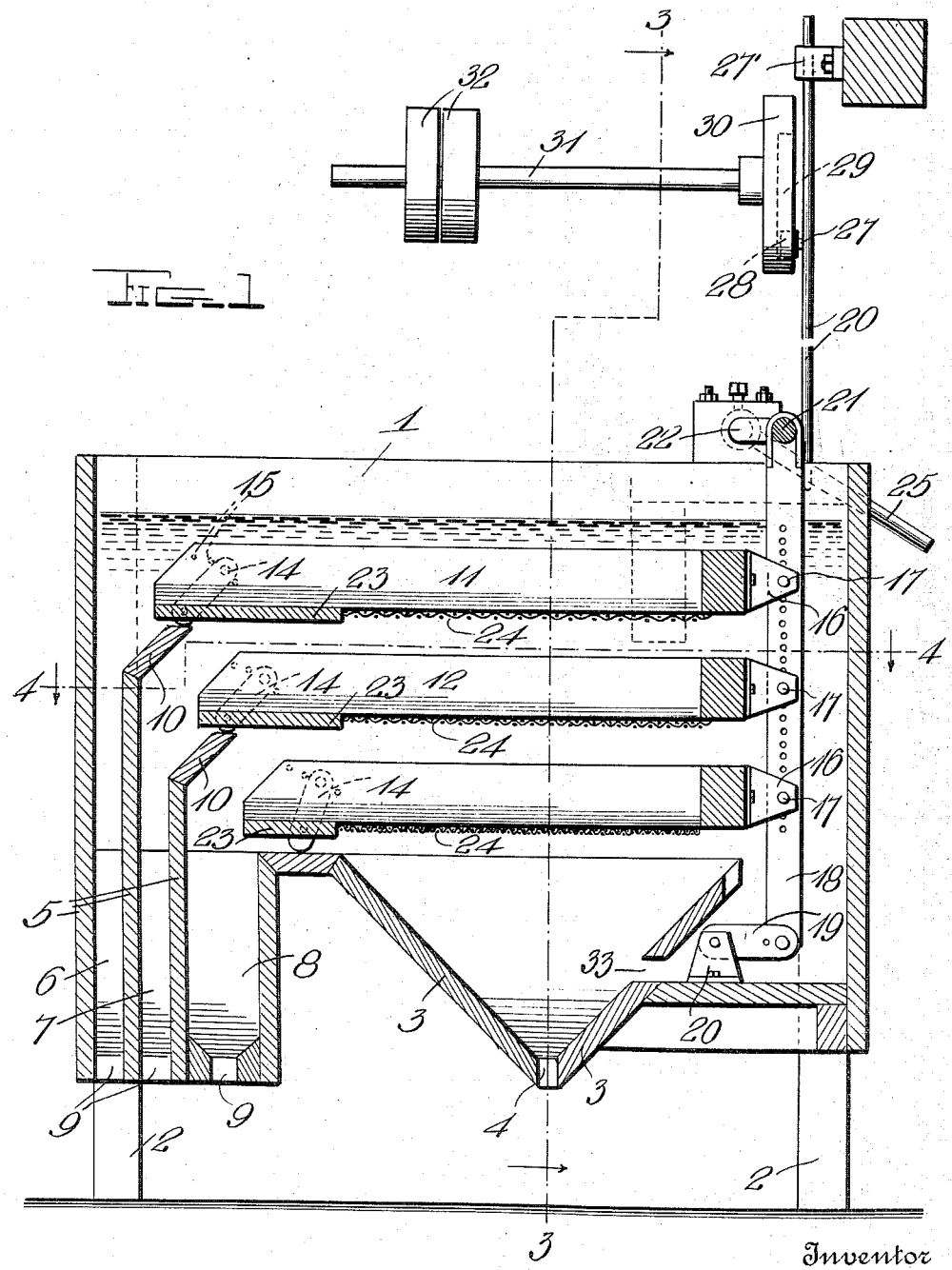
Witnesses
Inventor
F. O. Stromborg
by H. B. Willson & Co
Attorneys

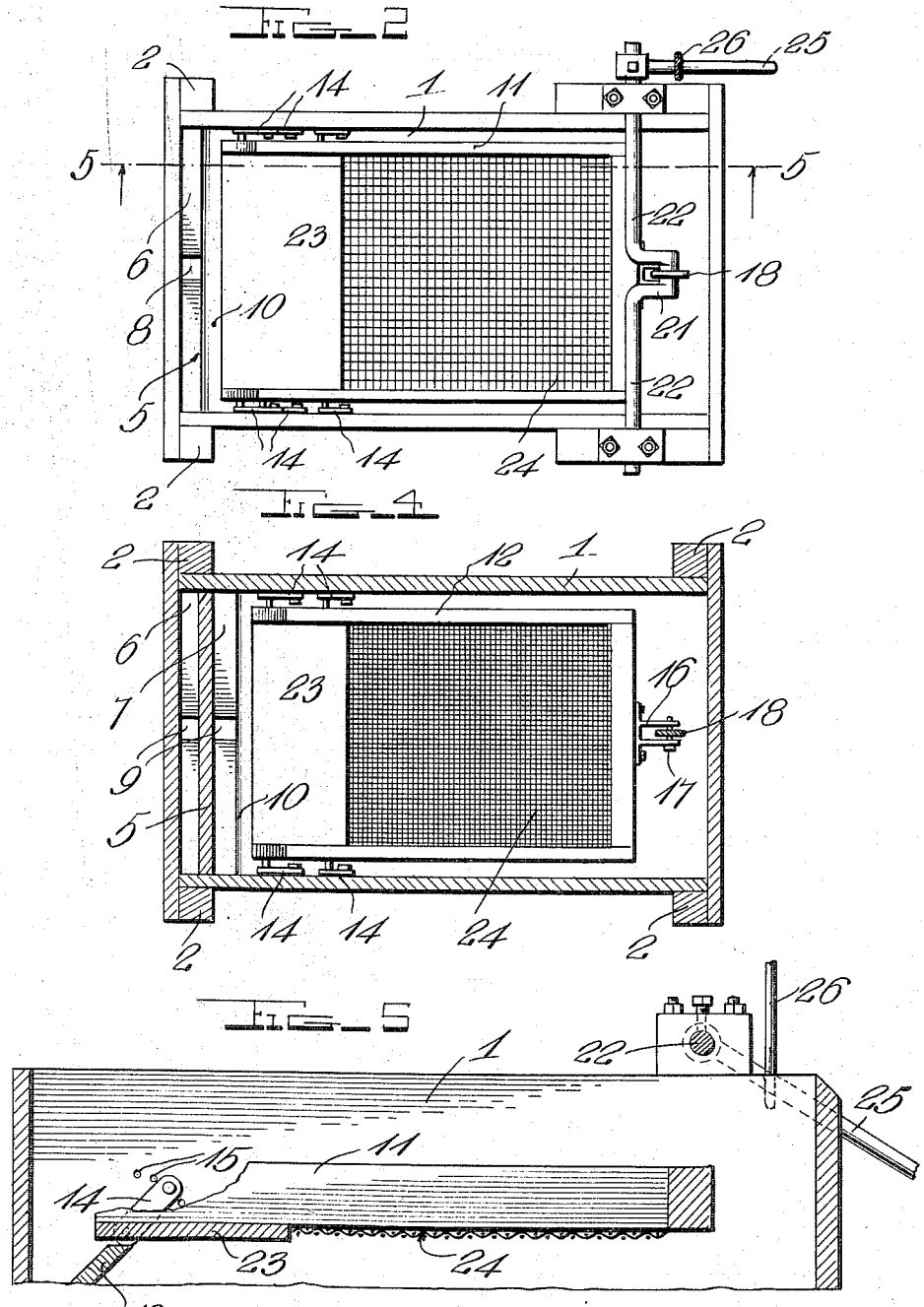

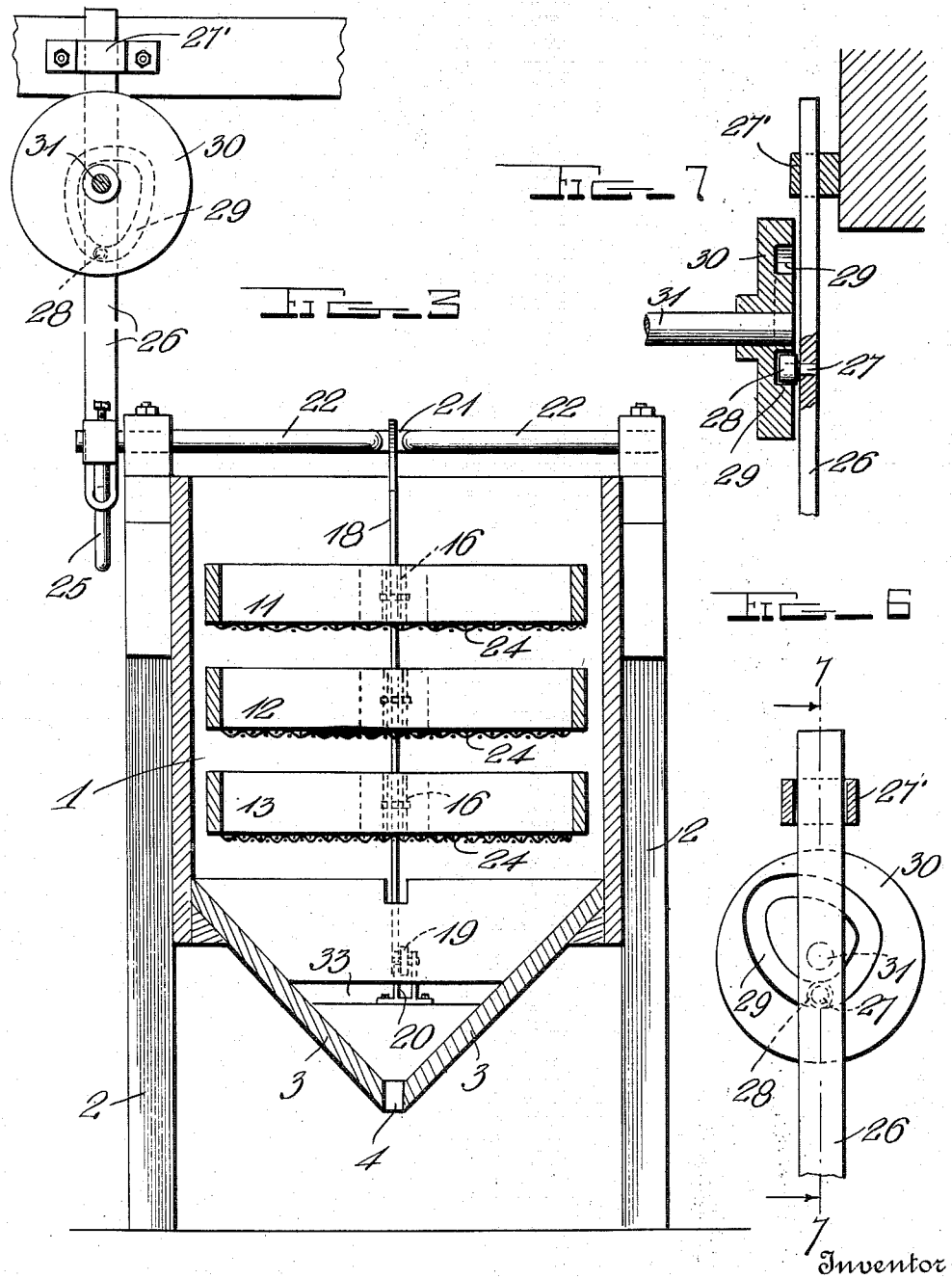

UNITED STATES PATENT OFFICE.

FRITZ OSCAR STROMBORG, OF SEATTLE, WASHINGTON.

SCREENING DEVICE.

1,005,900. Specification of Letters Patent. Patented Oct. 17, 1911.

Application filed October 6, 1910. Serial No. 585,645.

*To all whom it may concern:*

Be it known that I, FRITZ OSCAR STROMBORG, a citizen of the United States, residing at Seattle, in the county of King and State of Washington, have invented certain new and useful Improvements in Screening Devices; and I do declare the following to be a full, clear, and exact description of the invention, such as will enable others skilled in the art to which it appertains to make and use the same.

This invention relates to improvements in screening devices.

One object of the invention is to provide a screening device having a series of screens provided with an improved supporting mechanism whereby they may be adjusted to different inclinations thus facilitating the screening and separating of different kinds and conditions of material.

Another object is to provide a screening device having means whereby the screens may be given a quick downward and backward movement and a slow upward and forward movement and means whereby these movements may be varied or regulated.

With the foregoing and other objects in view, the invention consists of certain novel features of construction, combination and arrangement of parts as will be more fully described and particularly pointed out in the appended claims.

In the accompanying drawings: Figure 1 is a vertical longitudinal sectional view of a series of screens constructed and arranged in accordance with the invention; Fig. 2 is a top plan view of the screens and their supporting mechanism; Fig. 3 is a vertical transverse sectional view on the line 3—3 of Fig. 1; Fig. 4 is a horizontal sectional view on the line 4—4 of Fig. 1; Fig. 5 is a vertical sectional view on the line 5—5 of Fig. 2; Fig. 6 is an end view of the power operating mechanism for the screens; and, Fig. 7 is a vertical sectional view on the line 7—7 of Fig. 6.

In the embodiment of the invention I provide a tank 1 which may be supported in any suitable manner and is here shown as being provided with supporting legs or standards 2 arranged adjacent each corner of the same. The tank 1 is provided with a hopper bottom 3 which inclines from all directions toward a discharge opening 4 arranged therein as shown. In one end of the tank is arranged a series of vertically disposed partitions 5 which divide this end of the tank into a series of discharge chutes 6, 7, and 8 having at their lower ends reduced discharge openings 9. On the upper ends of the partitions 5 are arranged deflecting boards 10 which serve to bring the material from the screens into their respective chutes.

Arranged in the tank 1 are a series of horizontally disposed screen frames of which there may be any desired number, three of the same being shown in the present instance and numbered respectively 11, 12 and 13. These screen frames are supported at their outer ends on short hangers 14 which are pivotally connected to the outer sides of the screen frames adjacent the bottom of the same and are adjustably and pivotally connected at their upper ends to the inner sides of the tank by pivot pins which are adapted to be engaged with a series of pivot holes or sockets 15 arranged in the inner sides of the tank adjacent the open end of each screen frame as shown. The screen frames are provided on their opposite closed ends with centrally disposed supporting brackets 16 which are adjustably connected by pivot pins 17 to a vertically disposed operating bar 18 having formed therein a series of apertures adapted to receive the pivot pins 17 whereby the inner ends of the screen frames may be supported at the desired elevation for holding the screens at the desired angle of inclination. The operating bar 18 is pivotally and adjustably connected at its lower end to a link 19 which in turn is pivotally connected to a supporting bracket 20 arranged on the bottom of the hopper as shown. The upper end of the operating bar 18 is loosely connected to a crank 21 formed in the center of a rock shaft 22 journaled in suitable bearings on the opposite sides of the tank as shown.

The screen frames 11, 12 and 13 are open at their discharge ends and at said ends are provided with solid bottoms 23 which extend back far enough to prevent material passing through one screen from dropping into the chute of the screen below, thus providing for the effectual separation of the material being screened. The open space in the screen bottoms between the bottoms 23 and the opposite ends of the frames is covered by any suitable form of screen fabric 24 said fabric being of different grades or fineness in the several screens.

On one end of the rock shaft 22 is secured an operating handle 25 whereby the shaft may be rocked by hand to impart the desired motion to the screen frames. In thus rocking the shaft, the operating bar 18 is reciprocated and is also swung backwardly and forwardly and the reciprocating and swinging motion thereof is imparted to the screen frames to give the same an up and down movement as well as a forward and rearward movement.

In connection with my improved screening device I provide a power operating mechanism comprising an operating rod 26 which is connected at its lower end in any suitable manner to the handle 25 and is slidably engaged at its upper end with a guide bracket 27¹ arranged on a suitable support. On the rod 26 is arranged a laterally projecting operating pin or stud 27 which is provided with an antifriction roller 28. The pin 27 and roller 28 is adapted to be engaged with a cam slot 29 formed in an operating wheel or disk 30 fixed on the end of a drive shaft 31 which is mounted in suitable bearings (not shown). The shaft 31 is provided with drive pulleys 32 by means of which a belt from any suitable power may be applied thereto. By connecting the operating rod 26 with the cam slot in the disk 30 as herein shown and described, the screen will be given a slow upward and forward movement and a quick downward and backward movement which may be regulated by adjusting the screen frames in the manner described thereby facilitating the operation of the device for the separation or screening of different kinds and conditions of material. By adjusting the connection at the lower end of the rod 26 with the handle 25 to bring said connection nearer to or farther from the shaft end of the handle the throw or rocking movement of the shaft may be increased or decreased thus imparting a greater or less swinging movement to the screen frames.

The tank 1 is designed to contain water which is supplied thereto and maintained at the desired level by any suitable water supplying mechanism and in order to permit the water to be entirely drained from the bottom of the tank I provide a drain opening 33 in the upper portion of one side of the hopper bottom as shown.

In the operation of the device the material to be separated is fed onto the upper screen 11 in any suitable manner and the particles fine enough to pass through the screen material 24 will drop onto the next lower screen 12 while the coarser material which will not pass through the screen is discharged from the open end thereof onto the chute 6. The material passing through the screen 11 onto the screen 12 is separated in the same manner, the finer particles thereof passing through the screen material of the frame 12 and onto the screen 13, while the coarser material is discharged from the screen frame 12 into the chute 7. The material falling onto the screen 13 which is fine enough to pass through the screen material thereof falls onto the hopper bottom 3 and is discharged through the opening 4 therein while the coarser material is discharged from the open end of said screen into the chute 8.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a screening apparatus, the combination of a tank, links pivotally secured to the inside of the walls thereof, a screen pivotally supported on said links at one end, a bracket upon the bottom of the tank, a link pivotally connected to the bracket, a rod adjustably and pivotally secured to the other end of the screen and also pivotally secured to the last named link, and means for oscillating and reciprocating said rod.

2. In a screening apparatus, the combination of a tank, links pivotally secured to the inside of the walls thereof, a screen pivotally supported on said links at one end, a bracket upon the bottom of the tank, a link pivotally connected to the bracket, a rod adjustably and pivotally secured to the other end of the screen and also pivotally secured to the last named link, a cranked shaft journaled in bearings on top of the tank pivotally connected to the rod, and means for oscillating the crank shaft.

In testimony whereof I have hereunto set my hand in presence of two subscribing witnesses.

FRITZ OSCAR STROMBORG.

Witnesses:
 CHAS. McCANN,
 DAVID HORON.